(12) United States Patent
Hale et al.

(10) Patent No.: US 10,108,919 B2
(45) Date of Patent: *Oct. 23, 2018

(54) MULTI-VARIABLE ASSESSMENT SYSTEMS AND METHODS THAT EVALUATE AND PREDICT ENTREPRENEURIAL BEHAVIOR

(71) Applicant: Kountable, Inc., San Francisco, CA (US)

(72) Inventors: Christopher Hale, Mill Valley, CA (US); Craig M. Allen, Keller, TX (US); Catherine Nomura, Mill Valley, CA (US)

(73) Assignee: Kountable, Inc., Greenbrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,666

(22) Filed: Oct. 18, 2017

(65) Prior Publication Data

US 2018/0060781 A1 Mar. 1, 2018

Related U.S. Application Data

(63) Continuation of application No. 14/671,868, filed on Mar. 27, 2015.

(Continued)

(51) Int. Cl.
  *G06Q 10/06* (2012.01)
  *G06F 17/30* (2006.01)
  *G06Q 50/00* (2012.01)

(52) U.S. Cl.
  CPC .. *G06Q 10/06375* (2013.01); *G06F 17/30598* (2013.01); *G06F 17/30864* (2013.01); *G06Q 50/01* (2013.01)

(58) Field of Classification Search
  USPC .......................................................... 705/7
  See application file for complete search history.

(56) References Cited

U.S. PATENT DOCUMENTS

| | | | |
|---|---|---|---|
| 7,640,196 B2 * | 12/2009 | Weiss | G06Q 30/02 705/35 |
| 8,576,818 B2 * | 11/2013 | Dahl | G01S 5/14 370/338 |

(Continued)

FOREIGN PATENT DOCUMENTS

| | | |
|---|---|---|
| EP | 3126997 A1 | 2/2017 |
| EP | 3342130 | 7/2018 |

(Continued)

OTHER PUBLICATIONS

"Extended European Search Report", European Patent Application No. 15773464.1, dated Aug. 1, 2017, 9 pages.

(Continued)

*Primary Examiner* — Brandon Hoffman
*Assistant Examiner* — Samuel Ambaye
(74) *Attorney, Agent, or Firm* — Carr & Ferrell LLP

(57) ABSTRACT

Multi-variable assessment systems and methods that evaluate and predict entrepreneurial behavior are provided herein. Methods include obtaining entrepreneur data related to personal skills data, business history data, and social network data for the entrepreneur across a plurality of network modalities, the plurality of network modalities including social networks, phone records, and message records, determining business event information for business events identified between the entrepreneur and contacts of the entrepreneur found in the entrepreneur data, and performing a dynamic measurement of engagement between the entrepreneur and the contacts by looking for contacts between the entrepreneur and the contacts that cross the plurality of network modalities, wherein the dynamic measurement includes an entrepreneur score for the entrepreneur.

12 Claims, 9 Drawing Sheets

Related U.S. Application Data

(60) Provisional application No. 61/973,209, filed on Mar. 31, 2014.

(56) References Cited

U.S. PATENT DOCUMENTS

| | | | |
|---|---|---|---|
| 8,630,888 B2 | 1/2014 | Seefeld et al. | |
| 8,676,740 B2* | 3/2014 | Ueki | A61B 5/1176 |
| | | | 382/124 |
| 9,892,460 B1 | 2/2018 | Winklevoss et al. | |
| 2004/0010697 A1 | 1/2004 | White | |
| 2006/0085325 A1* | 4/2006 | Jammal | G06Q 40/025 |
| | | | 705/38 |
| 2008/0112551 A1 | 5/2008 | Forbes et al. | |
| 2011/0142347 A1 | 6/2011 | Chen et al. | |
| 2012/0046990 A1* | 2/2012 | Codina | G06Q 10/0631 |
| | | | 705/7.28 |
| 2012/0310814 A1* | 12/2012 | McNab | G06Q 20/10 |
| | | | 705/37 |
| 2013/0006879 A1* | 1/2013 | Ramanathan | G06Q 10/10 |
| | | | 705/319 |
| 2013/0018964 A1* | 1/2013 | Osipkov | G06Q 10/107 |
| | | | 709/206 |
| 2013/0173598 A1 | 7/2013 | Nguyen | |
| 2013/0218787 A1 | 8/2013 | Powell | |
| 2013/0317966 A1* | 11/2013 | Bass | G06Q 30/02 |
| | | | 705/37 |
| 2014/0067375 A1* | 3/2014 | Wooters | G06F 17/28 |
| | | | 704/9 |
| 2014/0328219 A1 | 11/2014 | Forbes et al. | |
| 2015/0109428 A1 | 4/2015 | Mechaley, Jr. | |
| 2015/0193781 A1 | 7/2015 | Dave et al. | |
| 2015/0278742 A1 | 10/2015 | Hale et al. | |
| 2015/0373020 A1 | 12/2015 | Hale et al. | |
| 2016/0300222 A1 | 10/2016 | Yang | |
| 2017/0180134 A1 | 6/2017 | King | |
| 2017/0331896 A1 | 11/2017 | Holloway et al. | |
| 2018/0082290 A1 | 3/2018 | Allen et al. | |
| 2018/0082291 A1 | 3/2018 | Allen et al. | |

FOREIGN PATENT DOCUMENTS

| | | |
|---|---|---|
| WO | WO2013126713 | 8/2013 |
| WO | WO2015153380 | 10/2015 |
| WO | WO2017044197 A1 | 3/2017 |

OTHER PUBLICATIONS

Patent Cooperation Treaty Application No. PCT/US2015/023194, "International Search Report and Written Opinion," dated Aug. 18, 2015, 15 pages.

Patent Cooperation Treaty Application No. PCT/US2016/044307, "International Search Report and Written Opinion," dated Feb. 17, 2017, 11 pages.

"Office Action," European Patent Application No. 15773464.1, dated May 2, 2018, 9 pages.

* cited by examiner

MULTI-VARIABLE ASSESSMENT SYSTEMS AND METHODS THAT EVALUATE AND PREDICT ENTREPRENEURIAL BEHAVIOR

CROSS REFERENCE TO RELATED APPLICATIONS

This Non-Provisional patent application is a continuation of, and claims the benefit of, U.S. patent application Ser. No. 14/671,868, filed Mar. 27, 2015, entitled "Multi-Variable Assessment Systems and Methods that Evaluate and Predict Entrepreneurial Behavior," which claims the benefit of U.S. Provisional Patent Application Ser. No. 61/973,209, filed on Mar. 31, 2014, entitled "Systems and Methods for Entrepreneurial Prediction." All of the aforementioned disclosures are hereby incorporated by reference herein in their entireties including all references and appendices cited therein.

FIELD OF THE INVENTION

The present technology pertains to the field of behavior scoring and prediction, and more particularly to a multi-variable assessment system that determines scores or measures relating to the likelihood of various business-related outcomes.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method, including: obtaining entrepreneur data related to personal skills data, business history data, and social network data for the entrepreneur across a plurality of network modalities, the plurality of network modalities including social networks, phone records, and message records; determining business event information for business events identified between the entrepreneur and contacts of the entrepreneur found in the entrepreneur data; and performing a dynamic measurement of engagement between the entrepreneur and the contacts by looking for contacts between the entrepreneur and the contacts that cross the plurality of network modalities, where the dynamic measurement includes an entrepreneur score for the entrepreneur. Other embodiments of this aspect include corresponding computer systems, apparatus, and computer programs recorded on one or more computer storage devices, each configured to perform the actions of the methods.

One general aspect includes a multi-loci modeling method, the method including: obtaining for plurality of individuals, entrepreneur data related to personal skills data, business history data, and social network data for the entrepreneur across a plurality of network modalities; extracting attributes from the entrepreneur data; and performing a multi-loci modeling by: applying attribute weightings to each of the attributes extracted for the individuals; and grouping the individuals into customer clusters in such a way that a variation between individuals is maximized relative to a group business measurement; calculating a centroid of each of the customer clusters; comparing a target individual to the customer clusters; and determining a best performing cluster for the target individual, wherein the best performing cluster is a customer cluster of the customer clusters with a shortest distance between the target individual and the customer cluster. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
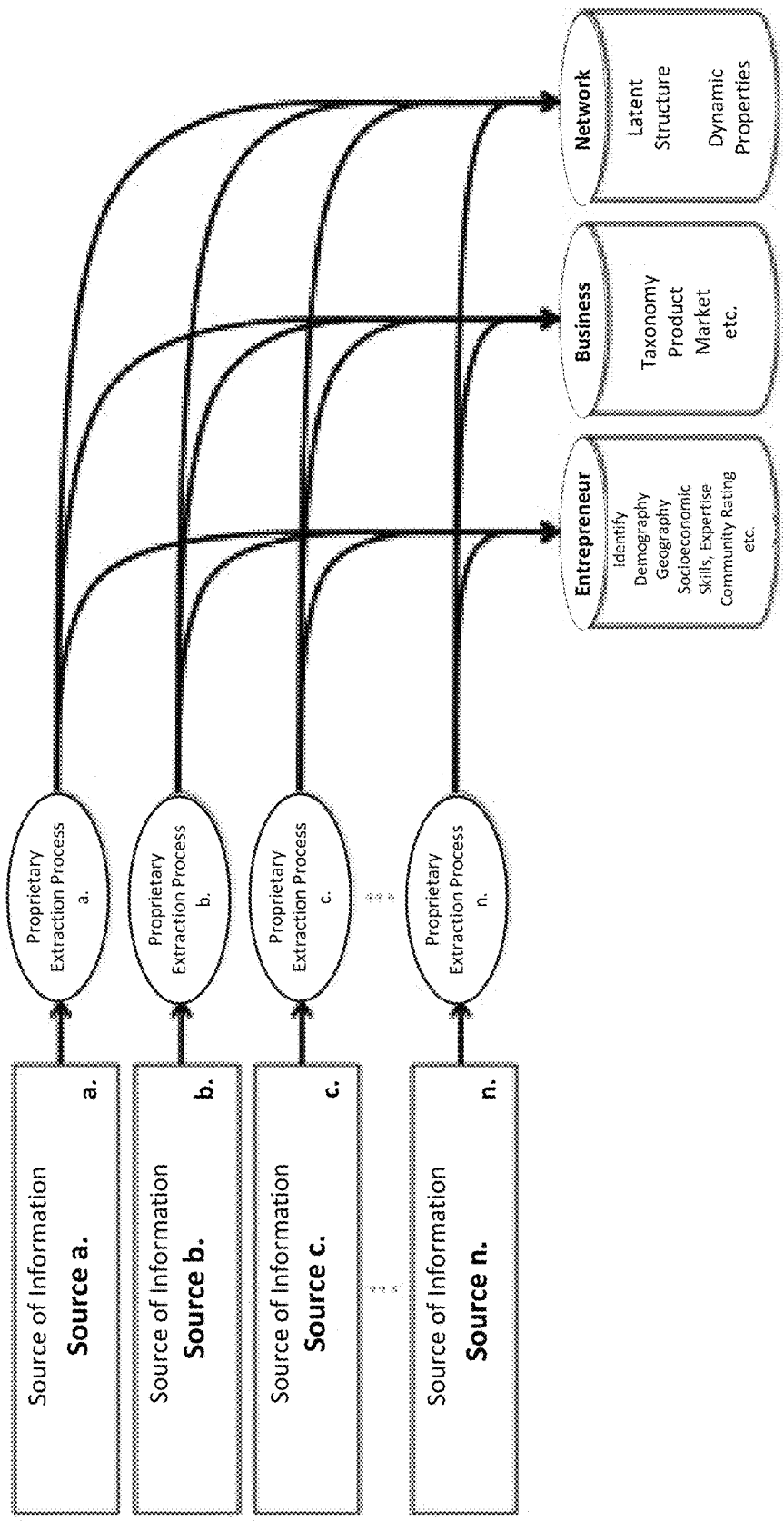
FIG. 1 is a schematic diagram of a process for receiving various sources of information, extracting relevant information and translating the extracted information so that it can be stored in data stores relating to attributes of either the entrepreneur, the business opportunity or to the social network and social capital of the entrepreneur.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The present technology pertains to the field of behavior scoring and prediction, and more particularly to multi-variable assessment methods and processes that determine scores or metrics relating to the likelihood of various business-related outcomes.

For example, some assessment scores, which serve as predictors of both specific behaviors and of general capabilities are known in the art. Such systems allow for the assignment of scores relating to credit worthiness (or purchasing likelihood, or next click in web browsing behavior) or the likelihood of other very specific behaviors. Some scores assess general capabilities such as intelligence, but these scores tend to be either very specific to a single feature relating to an individual, or are very general relating to a global attribute such as intelligence.

Additionally, behavior scores relating to repayments due under contracts, such as credit scores, rely upon centralized stores of verified information about previously demonstrated behavior.

In accordance with the present technology, a multi-variable system and method are provided that allow for the scoring of a complex set of inputs, together with information associated with social-network structure and activity of an individual. These diverse types of information are coalesced by the present technology to assess the entrepreneurial behavior of an individual. This technology solves the known problem of predicting entrepreneurial success—which may for the purpose of this description be defined as predicting the likelihood of a business person successfully conducting one or more business transactions and subsequently repaying investment capital that may have been advanced for that business purpose.

To be sure, the present technology calculates a plurality of unique and proprietary scores and indications that allow for the assessment of entrepreneurial ability of an individual. This assessment can be utilized to determine the suitability of the individual for a business opportunity or as an informative tool that allows the individual to assess their entrepreneurial ability as compared to other individuals.

The problem of predicting entrepreneurial success, including repayment, is often exacerbated by having little or no verifiable information about the previous credit history of the entrepreneur. This problem is also further exacerbated by many jurisdictions having no central source for verification of income and payment history of the entrepreneur's past performance. Furthermore, the current technology incorporates within its scoring methodology the view that the legal system in which the entrepreneur operates is either ineffective or provides an impractical enforcement mechanism for encouraging contract adherence by the entrepreneur, either due to the uncertainty within that legal system or because of the impracticality of pursuing legal remedies due to the expense of such remedy relative to the investment capital hoping to be recovered.

The present technology and scoring system is neither based upon a single behavior, nor is it considered a general attribute of an individual. Entrepreneurial potential (or predictability), as defined herein, is seen as a complex set of personal factors, including capabilities, the matching of these personal characteristics with a specific business opportunity and with the social capital that an entrepreneur has accrued within a specific community of operation. The thesis of this technology includes the notion that the matches between all of these factors can be developed and improved with conscious attention and training of an individual. Furthermore, some embodiments of the present technology do not presume that there is a single ideal of entrepreneurship nor does it presume that there is a single 'anti-ideal' of entrepreneurship, so the resulting scoring models are not limited to a single dimension of reference.

Broadly, the present technology provides methods and systems for capturing as many of a plurality of types of information about entrepreneurs and their communications as possible (especially electronic data gathered from emails, websites, forums, blogs, and so forth). The present technology also provides systems and methods for extracting measures and/or features of the information and the communications and links (e.g., social connections) made by the entrepreneur (or between the entrepreneur and other parties). The present technology may also employ these measures (e.g., metrics) to develop predictive models relating to entrepreneurship.

In some embodiments, the present technology can employ the created models to generate scores that represent entrepreneurial success (e.g., entrepreneurial potential) for individuals, opportunities, and social networks. The present technology may also communicate these scores to interested parties or back to the entrepreneur.

FIG. 1 is a diagram of a process for receiving various sources of information, extracting relevant information and translating the extracted information so that it can be stored in data stores relating to attributes of either the entrepreneur, the business opportunity or to the social network and social capital of the entrepreneur. Each of the sources of information involves a specific process to extract the relevant fields to be stored. As more sources of information are incorporated into the extraction process, more specific data can be added to the categorized data leading to a more complete set of relevant data. This process can be facilitated using the system 405 of FIG. 4, described in greater detail below.

Figure 2:
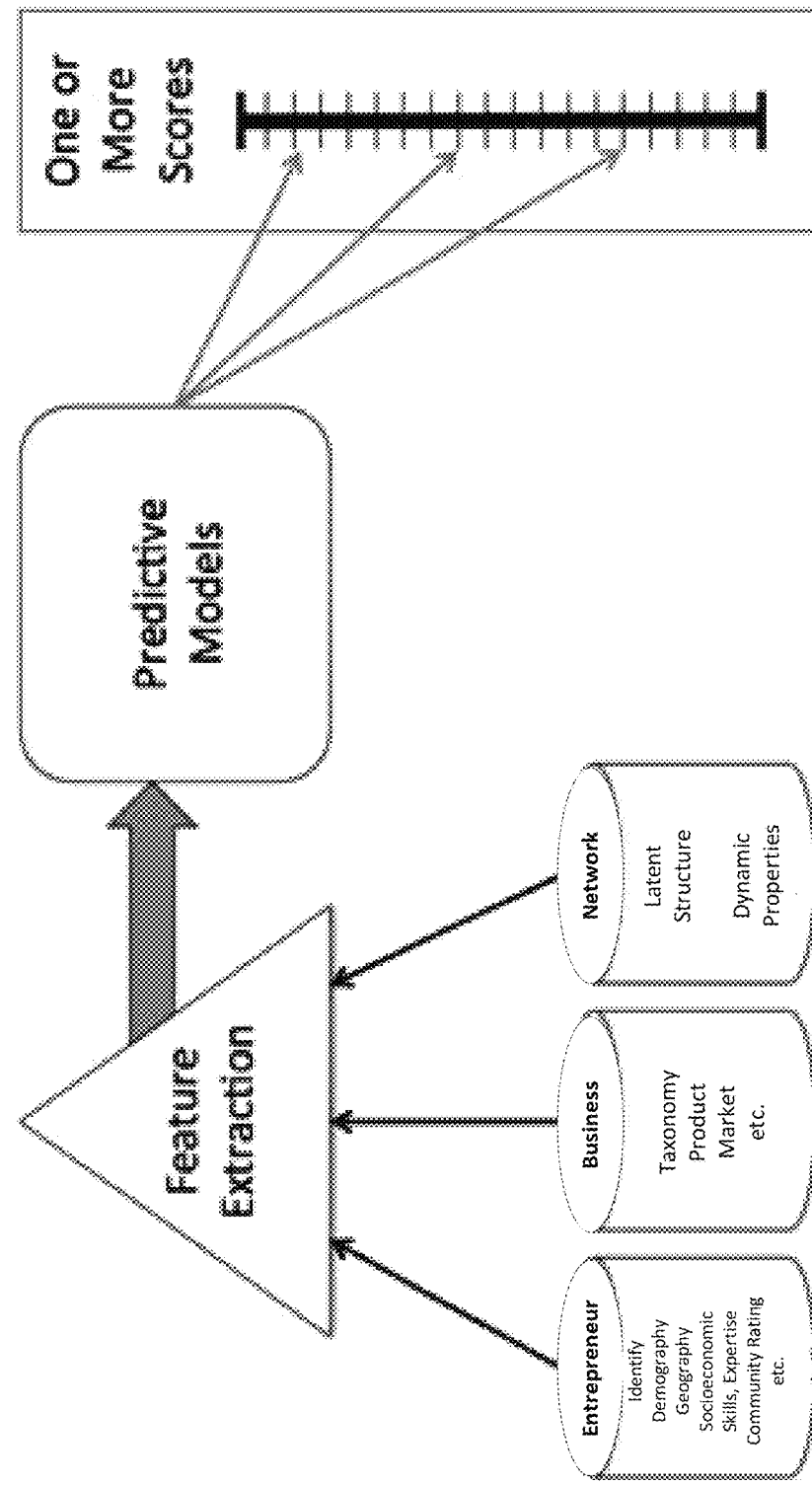
FIG. 2 is a diagram of a process for extracting features from the categorized databases, providing these features to predictive models (either mathematically derived or qualitatively derived), which then produces scores relating to the entrepreneurial success in question.

FIG. 2 is a diagram of a process for extracting features from the categorized databases, providing these features to predictive models (either mathematically derived or qualitatively derived), which then produces scores relating to the entrepreneurial success in question. The categories of data presented are indicative of the general categories that may be kept relative to an entrepreneur, a specific business opportunity, social network of the individual, social capital of the individual, or any combinations thereof.

Figure 3:
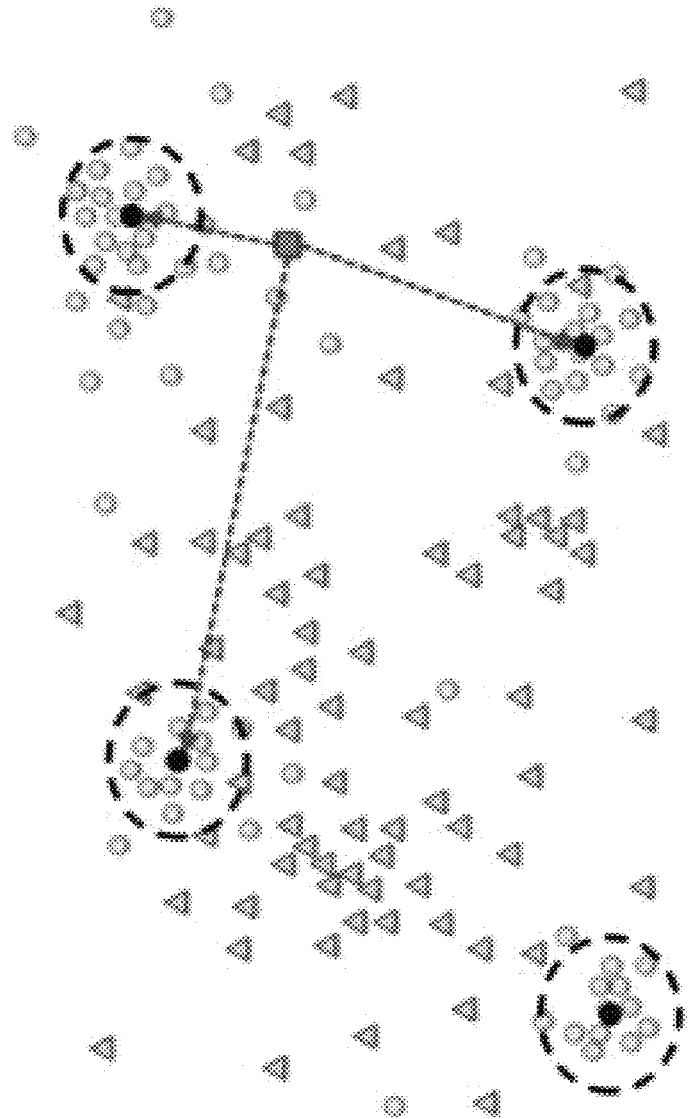
FIG. 3 illustrates a scoring model with multiple idealized clusters of behavior, for use in accordance with the present technology.

FIG. 3 shows a scoring model with multiple idealized clusters of behavior. In scoring models of this type, the subject is compared to multiple idealized targets and scored based upon the nearest idealized cluster. Guidance is given by suggesting to the subject behaviors that would make the subject's behavior correspond more closely with one or more of the idealized behavior clusters.

Figure 4:
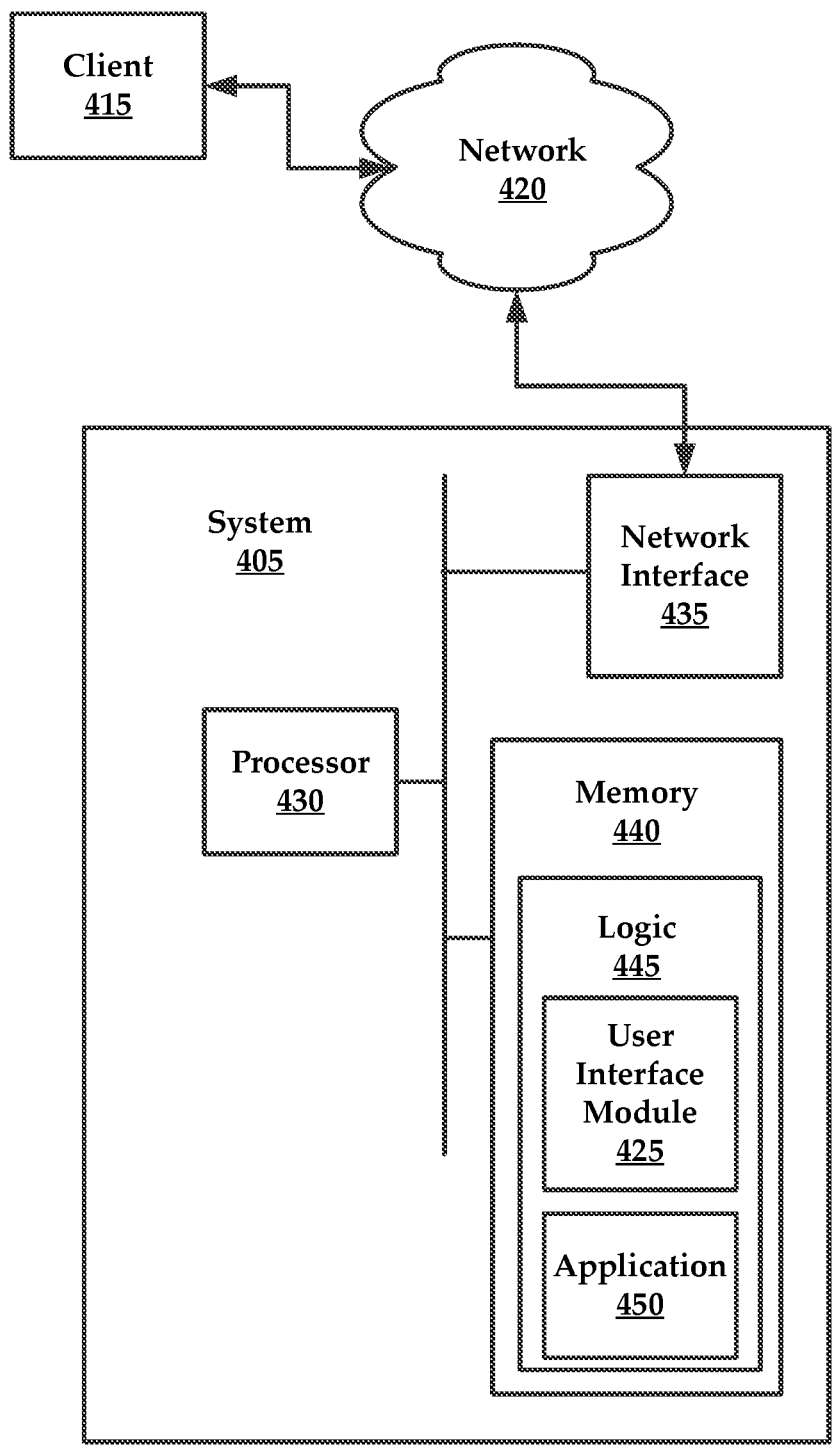
FIG. 4 is a schematic diagram of an exemplary computing architecture that can be used to practice aspects of the present technology.

FIG. 4 illustrates an exemplary architecture for practicing aspects of the present technology. The architecture comprises a business transaction analysis system, hereinafter "system 405" that is configured to provide various functionalities, which are described in greater detail throughout this document. Generally the system 405 is configured to communicate with client devices, such as client 415. The client 415 may include, for example, a Smartphone, a telephone a laptop, a computer, or other similar computing and/or communication device. An example of a computing device that can be utilized in accordance with the present technology is described in greater detail with respect to FIG. 8.

The system 405 may communicatively couple with the client 415 via a public or private network, such as network 420. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 420 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The system 405 generally comprises a processor 430, a network interface 435, and a memory 440. According to some embodiments, the memory 440 comprises logic (e.g., instructions or applications) 445 that can be executed by the processor 430 to perform various methods. For example, the logic may include a user interface module 425 as well as a data aggregation and correlation application (hereinafter application 450) that is configured to provide the functionalities described in greater detail herein.

It will be understood that the functionalities described herein, which are attributed to the system 405 and application 450 may also be executed within the client 415. That is, the client 415 may be programmed to execute the functionalities described herein. In other instances, the system 405 and client 415 may cooperate to provide the functionalities described herein, such that the client 415 is provided with a client-side application that interacts with the system 405 such that the system 405 and client 415 operate in a client/server relationship. Complex computational features may be executed by the system 405, while simple operations that require fewer computational resources may be executed by the client 415, such as data gathering and data display.

In general, the user interface module 425 may be executed by the system 405 to provide various graphical user interfaces (GUIs) that allow users to interact with the system 405. In some instances, GUIs are generated by execution of the application 450 itself. Users may interact with the system 105 using, for example, a client 415. The system 405 may generate web-based interfaces for the client.

In some embodiments the system 405 may be configured to derive a score (or set of scores) that can be used to predict entrepreneurial behavior and success-potential of a Business Person based upon information collected from any of: a Business Person, about the Business Person from third party sources, individuals in contact with the Business Person, social networks of the individual, and other information sources that can yield information relating to or are indicative of the entrepreneurial behavior of the individual. These scores are used within the context of a potential business transaction, such as the sale of a business or extending of a loan to an individual for a business purpose.

In some embodiments the system 405 is configured to extract information about entrepreneurial potential of a Business Person from social networks and other data. For example, the system 405 may be configured to link with various sources such as Facebook™, Linkedin™, Twitter™, and so forth, using an application programming interface (API). Alternatively, the system 405 may scrape web pages or social network feeds for necessary information.

In some embodiments, the system 405 is configured to calculate a level of influence that a Business Person's social relationships will exert over the contracts entered into between or among the Business Person and other parties, such as investors. For example, the system 405 can determine a number of business contacts for an individual, the relative influence of each of these contacts, and a nature of relationship between the individual and their contacts. By example, the system 405 may score a relationship higher where the contact is highly influential, if the individual is in a very close relationship with the contact. Conversely the system 405 may score a relationship lower where the contact is highly influential, if the individual is only casually connected to the contact.

In some embodiments, the system 405 is configured to detect progress in the entrepreneurial development of individual Business Persons based upon their electronic communications such as emails, SMS messages, social network posts, and so forth.

In some embodiments, the system 405 is configured to provide proscriptive advice to Business Persons seeking to improve their entrepreneurial capabilities by measuring and suggesting changes to their electronic communications. For example, the system 405 may process emails of an individual and identify the vocabulary used in emails that may positively or deleteriously affect the business purposes of the Business Person. For example, if the system 405 detects poor grammar usage or typos in an individual's emails, the system 405 can instruct the individual in how to properly proofread their communications.

In some embodiments, the system 405 is configured to electronically receive data relating to a Business Person's set of social network data with information about various individuals to whom the Business Person is in contact. The system 405 is further configured to receive data relating to the date, time, frequency and length of communication messages between a Business Person and other individuals.

In other embodiments, the system 405 is configured to append additional data to the communication information relating to the Business Person so that social status and geographic information about the Business Person and individuals with whom the Business Person is in contact is collected or extrapolated for use by the system 405.

In additional embodiments, the system 405 is configured to incorporate geographic-specific data relating to social, economic, demographic information into the data processing system; a system for communication between Business Persons whereby they attain an electronic history of participation in discussions about business topics.

In accordance with the present disclosure, the system 405 is configured to crowdsource (or use crowdsourced) information, whereby a known community of Business Persons provides assessment of the quality and content of communications by a Business Person. The system 405 can also combine electronic information from a plurality of sources so as to provide a score or scores that relate to various facets of the Business Persons such as their business skills, abilities, probability of business success, likelihood of completion of business goals, likelihood of future business development and likelihood of various investment returns that may be relevant to potential investors. The system 405 can create a single score that represents any combination of the aforementioned facets. In other instances, several scores may be calculated and correlated to one another. For example, the system 405 may generate one score for probability of business success, as well as a second score that represents likelihood of future business development.

Figure 5:
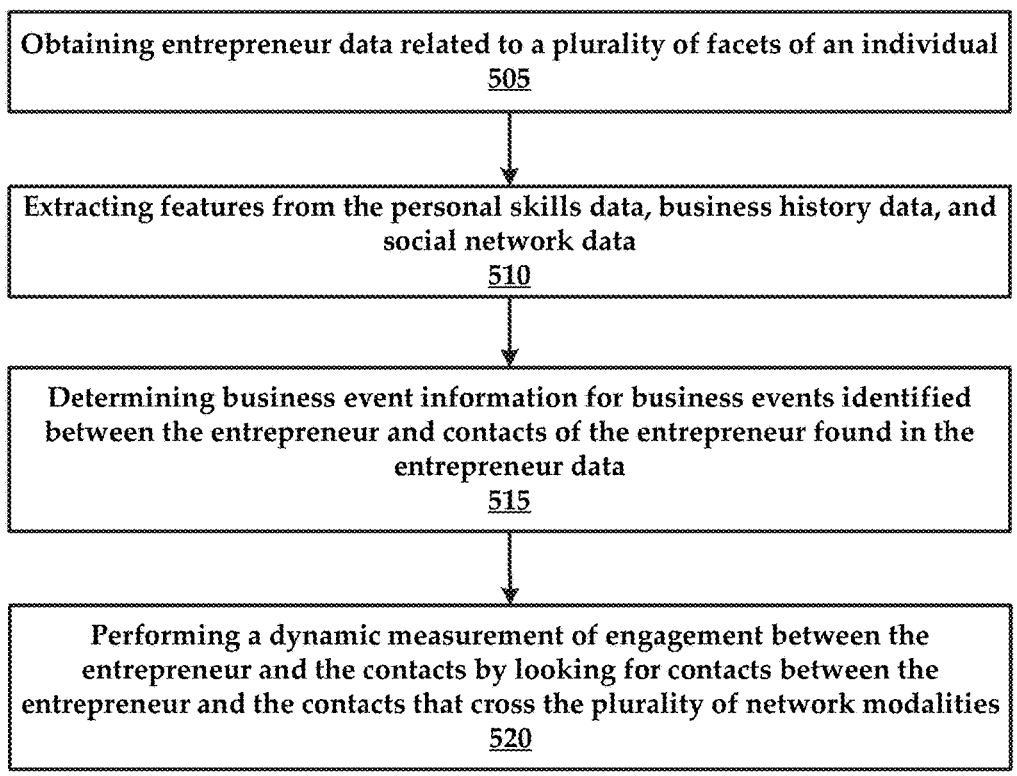
FIG. 5 is a flowchart of an example method of the present technology.

FIG. 5 illustrates an example method that can be executed by the system 405 of FIG. 4. The method comprises the system 405 obtaining 505 entrepreneur data related to a plurality of facets of an individual. Examples of facets comprise personal skills data, business history data, and social network data. In some embodiments, entrepreneur data can be gathered across a plurality of network modalities.

In some embodiments, the system 405 collects information from several network modalities such as Facebook™, LinkedIn™, Google+™, phone records, SMS text records, e-mail meta-data, and so forth. The system 405 can examine the depth of engagement between a target individual and their contacts across these various modes of social connectedness. The system 405 is configured to examine how many different modalities are used, recency of contacts, and the temporal elements of change in engagement with each contact, especially those related to 'business events' identified by the target individual.

To be sure, each of these data features are important on their own, but the cross-modality aspect provides advantages and information about the target individual that would be impossible to obtain from a single feature analysis, or a plurality of individual features that are not correlated in a cross-modality analysis.

By way of example, as a business relationship is formed, contact with certain individuals increases as deal parameters are discussed. Those contacts may initially begin as an e-mail introduction, leading to a number of phone conversations, leading to more e-mails, leading to a connection via LinkedIn and other social media networks. The change in the number of connection points, the frequency and intensity of contact, and so forth is a dynamic measurement of engagement between individuals.

In some embodiments, the plurality of network modalities comprises social networks, phone records, and message records—just to name a few.

In more detail, the personal skills data comprises data surrounding the individual. This process involves the ability to find and access targeted entrepreneurs and to gather data from and about those individuals, their interests, their skills and their activities. With respect to business history data, the system 405 can obtain data surrounding the business of the entrepreneur, which includes gathering data about business history, about specific business opportunities generated by the entrepreneur, about transaction structures employed—or able to be employed—in the execution of those business opportunities, and the collection of actual execution statistics for their businesses.

The social network data can comprise data that relates to the social network of the entrepreneur and their business activities, the connections to people and entities, the frequency and intensity of contact and communication, and even the sequence of communications. Additional details regarding each of these types of data will be described below with reference to a feature extraction process.

According to some embodiments, the method can include the system 405 extracting 510 features from the personal skills data, business history data, and social network data. To be sure, while a wide variety of information is gathered pertaining to personal skills data, business history data, and social network data, the system 405 is configured to parse this data out into facets that can be used in transaction related processes, as described below.

In some embodiments, the system 405 collects information (e.g., entrepreneur data) using electronic data gathering techniques and stores the information as unstructured data.

The following paragraphs relate to feature/facet extraction processes. One example feature extraction is experience. The system 405 is configured to evaluate numerical and textual indicators of experience that are gathered from social network sites to create an experience indicator. Information used can include years in workforce, number of employers, positions held, skills enumerated by friends, press references to individuals resulting from search-engine queries.

Another feature relates to education. The system 405 will evaluate the entrepreneur data for indications of degrees earned, educational institutions attended, certificates of accomplishment or references to training attended as well as other indicators of affiliation with institutions of education.

Another example feature is geographical footprint. In some instances, social media platforms provide geo-coordinate information (e.g., of last login location) and textual clues (e.g., geographic references, home-town, city, state, country) that allow inferences to be made about an entrepreneur's footprint—or areas that are frequented by the individual. This geographical information, coupled with development information about the areas frequented (e.g., income per capita, GDP, demographics, general development indicators) allows inference about opportunities to which the entrepreneur has been exposed. Greater geographic exposure (based upon number of regions or continents or states) and economic exposure (based upon development measures) provide for inference into the breadth of experience of the entrepreneur.

Another example feature includes geographical distribution of contacts/friends. To be sure, just as the geographical footprint of the entrepreneur can be measured, several geographic markers are available for most of the contacts in the entrepreneur's social networks. Not only can the extent of the geographic reach of friends be measured, but the distribution into continent, country, region, and so forth be explored and evaluated by the system 405. Additional data such as income, GDP, demographics, technical development indices, political measures provide additional information on the 'richness' or variety of friend relationships of the individual. The system 405 can categorize an individual's relationships, for example, by region, by economic development of location, and so forth, and distributions of categorized friends and reach across physical space and economic distance factor into diversification measures.

Another feature that can be extracted by the system 405 comprises functional distribution of contacts. To be sure, just as contacts can be categorized by the system 405 based upon geography, the e-mail addresses of friends (or the domains of such e-mail addresses) provide indication of function. For example, many e-mail addresses of contacts emanate from domains with free carriers like 'gmail.com' or 'yahoo.com'—which indicate private or connections that are personal rather than institutional relationships. Other e-mail addresses have domains that are institutional in nature (e.g., bob.smith@jpmorgan.com or john.doe@savethechildren.org). The system 405 searches the domain of these e-mails via text analytics and classifies these contacts into various groupings (e.g., banking, government, political, NGO, religious, and so forth). The system 405 then evaluates a distribution of the classified e-mail contacts for each entrepreneur for diversification and for indicators of breadth.

In some embodiments, the system 405 can evaluate features related to social network messages for the individual. In some embodiments, the system 405 analyzes and categorizes social network messages on a social network feed for an individual into clusters. For example, some messages are mundane such as "I just ate a ham sandwich.", while some relate to current events "Rioting in streets.", and some relate to professional activity "New article on prescribing app in Pharmaceutical Journal" or technology issues "Where do we go now on Net Neutrality?". Messages can be categorized by the system 405 for the entrepreneur, and similarly categorized for the friends/contacts (followed/followers) of the individual. The system 405 determines the distribution of categorized feeds which provides measures for diversification, breadth and 'seriousness' of the individual.

In one embodiment, the system 405 uses a feature such as referrals. The system can detect and collect a referral network of entrepreneurs that, once they register with the system 405, refer other individuals to the system 405. Such referrals indicate a form of influence that is measured by the system 405. The quality of the person responding to the referral reflects on the status of the referring party.

In another feature, the system 405 can analyze phone records for the individual. The system 405 enables individuals to provide the system 405 with access to their phone records, for example by sending scanned images of their cell-phone records and/or by permitting the system 405 access to their phone-logs on their mobile devices. The system 405 utilizes time, duration and contact information from these logs to determine which contacts are current, who originates contact, what is the sequence of contact (e.g., following a call with a first contact a call is made to a second contact), what is the duration of contact (short message or long conversation), what is the frequency of contact, what is the time of day for contact and other similar events. The call information provides insight into the dynamic nature of the social network structure of the individual.

In some embodiments, the system 405 can also analyze SMS/MMS records in a manner that is similar to phone conversations. Additionally, the system 405 can also analyze email messages and email metadata from an analysis of email history. The system 405 can examine a frequency, level of engagement, and other similar measures as referenced above with the phone and SMS records. The system 405 can identify clusters of contacts that appear in groupings (cc or bcc records) of e-mail addressees. These, together with the other information that the system 405 gathers about the contacts provides the system 405 with category distributions and linkages between individuals that allow great insight into the dynamic aspects of the social network of the individual.

The previous paragraphs represent data collection and data processing tasks executed by the system 405. By layering the modalities of contact and examining the process of deepening the engagement with individuals across linkage modes the system 405 provides unique insight into the entrepreneurial ability of a target individual.

To be sure, these extracted entrepreneur data types can be used in various predictive scoring methodologies, as well as business opportunity analyses that utilize these predictive scores.

In some embodiments, the method includes the system 405 determining 515 business event information for business events identified between the entrepreneur and contacts of the entrepreneur found in the entrepreneur data.

Business event information includes various types of information about business ventures that the target individual participated in. For example, the system 405 can determine historical business information that relates to income, expense and business growth by date such as categories of sales, cost of goods, fixed and variable expenses, and so forth. This information is maintained to provide insight into the stability of the business operated by the target individual and to enable us to determine the stability and risk-factors associated with the business. Certain 'common-size' analyses such as dividing expenses by sales to obtain measures like 'labor per dollar of sales' allow the system 405 to combine many similar companies into categories to identify outliers. Additionally, the area of 'statistical process control' provided by the system 405 provides a suite of analyses that identify business elements that are 'out of control'—or that vary in ways that should raise alarm. The system 405 can identify and categorize business risks using fixed versus variable expense analysis to determine business break-even points.

In some embodiments, the entering of business data into the system 405 by the target individual is viewed as an indicator of the individual's diligence in reporting. The extent and regularity of the business reporting provides a measure of the individual's capabilities in communicating financial information and general 'bankability' of the individual.

In addition to collecting general business information, the system 405 is configured to allow the individual to enter sales amount, delivery date, invoicing date and collection date for their customers. This information provides for customer-by-customer scrutiny of payment patterns and potential payment delays by the system 405. From payment history information the system 405 can establish expected payment timing that relate to future transactions.

In some embodiments, the system 405 is adapted to maintain a set of desirable business behaviors that are used to assess the cross modality set of entrepreneurial data obtained as described above.

Examples of non-limiting examples of desirable business behaviors include business knowledge, capability within industry, communication ability, trust, relationship value relative to other individuals in the system 405, compliance, reliability, integrity, follow through, and responsiveness—just to name a few.

In some embodiments, the system 405 identifies indicators of these desirable characteristics and maintains estimates of relative strength for each individual.

In one example, a length of time between the sending of an e-mail query to an entrepreneur and receiving the response might figure into the 'score' relating to communication ability, value, reliability, follow through and responsiveness. The entrepreneur's ability to respond to basic business questions, such as asking them to categorize last-month's business expenses into fixed vs. variable costs might figure into the 'score' relating to knowledge and compliance. Each query or interaction with the system 405 that comprises a part of the individual and information gathering relationship can be utilized by the system 405 in 'scoring' of the individual along these attributes (e.g., facets). The assessment of the individual along these dimensions is dynamic and is expected to change as their relationships develop.

In some embodiments, the method includes analyzing a proposed transaction for the individual. In one embodiment, this analysis includes performing 520 a dynamic measurement of engagement between the entrepreneur and the contacts by looking for contacts between the entrepreneur and the contacts that cross the plurality of network modalities. To be sure, the dynamic measurement comprises at least one entrepreneur score for the entrepreneur. The entrepreneur score is a cross-modality score that can be calculated in a multi-loci modeling process, which is described in greater detail below.

As mentioned above, the capturing of entrepreneur data and extraction of features can continue even during the performance of a transaction (e.g., business opportunity) between the target individual and one or more parties. To be sure, the method can include the system 405 analyzing business transactions to determine an individual's current business behaviors during a business opportunity.

For example, as business transactions unfold, certain events associated with the business transactions require attention and fact reporting. For example, if a party provides financing that might involve some goods being shipped to an address in Kigali for use by an individual, the party might require that the entrepreneur photograph the goods at the port and upload the photo. This trail of business facts provides a very sound basis for evaluating the seriousness of the individual relative to the business opportunity. In some embodiments, the short-term nature of trade-finance obligations financed by a party for an individual provides a ready measure of compliance. In fact, an entire communication chain required for a transaction provides a test of entrepreneur willingness to comply—which is every bit as worthwhile as a stream of loan payments. Thus, the system 405 can continually monitor the individual's responses and behaviors to a financing party's requests for information and performance. The system 405 can maintain a script of expected behaviors for the individual and compare their actual performance to the script of expected behaviors. In this way, the system 405 can deduce compliance with the terms of the business opportunity and assess deviations from this expected behavior.

Also, the system 405 can gather actual transaction risk metrics. For example, the system 405 can determine the actual variations in payment amount, timing, and so forth for purchaser type and for product type. The system 405 can also determine, for example, which suppliers have consistent quality based on rejection rates, based on industry or product type, or based on other factors that would be apparent to one of ordinary skill in the art with the present disclosure before them.

Figure 6:
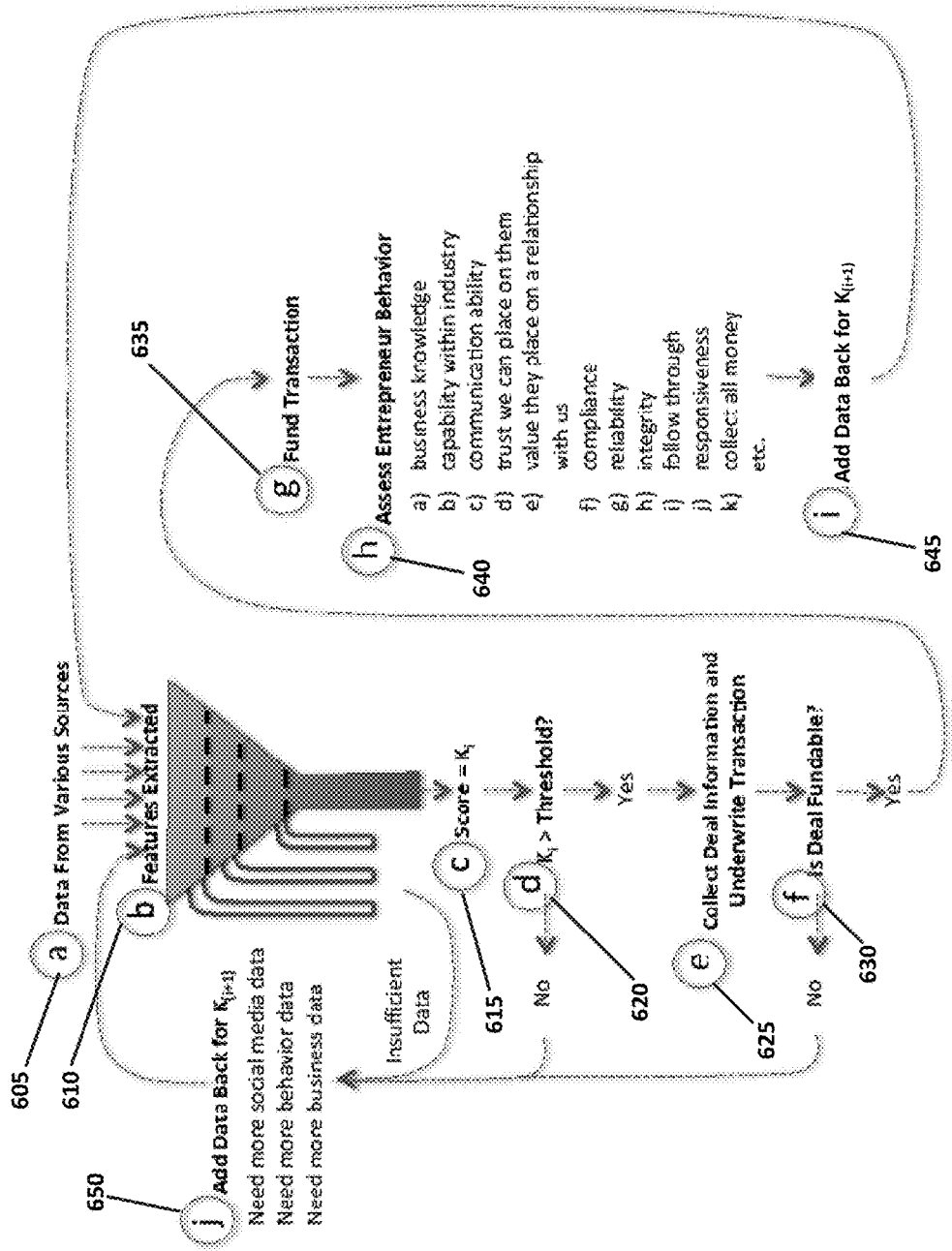
FIG. 6 is a flow diagram of an example feature extraction process, where features are used to validate a transaction, and preferably in some embodiments on an ongoing basis during the transaction.

Referring now to FIG. 6, another example method for iterative scoring and entrepreneurial evaluation is illustrated.

In an initial step 605, data is gathered as provided in the examples above. This data can comprise any of the entrepreneur data described herein. Next, the method includes a step 610 where features are extracted from the entrepreneur data.

An initial score ($K_i$) is calculated in step 615. Example K score calculations are described in greater detail throughout this disclosure.

To be sure, if insufficient entrepreneur data exists in the system, the system can collect more data, routing back to step 605. If sufficient entrepreneur data exists then the method proceeds to step 620 where the system can evaluate if the score $K_i$ is sufficient to move toward funding a transaction (e.g., business opportunity). Thus, the system can maintain scoring thresholds for a transaction. If the score calculated for the individual does not meet or exceed this threshold, the system can identify the transaction as incompatible. The system can identify those aspects or facets that contributed to the low score and provide suggestions that would, if implemented by the individual, cause their score to rise above the score threshold.

It will be understood that each transaction type might require differing amounts of entrepreneur data for a complete analysis of the transaction. Thus, the system can be configured to periodically determine, at each analysis step, if sufficient entrepreneur data exists to make an informed decision.

If the entrepreneur has a sufficient score ($K_i$) to pass the threshold, the system can then collect 625 information on transaction and ultimately determine 630 if the transaction is worthy of funding.

In some embodiments, the system can make multiple attempts to match the entrepreneur with a business opportunity if other opportunities are not a match.

In some embodiments a suitable business opportunity is found by the system and the system can cause 635 the transaction to be funded.

As mentioned above, the system can assess 640 entrepreneur behavior during transaction execution. The system can add 645 entrepreneur behavior during or after a transaction, or potentially after deficiency is detected. For example, the system can determine that the individual missed a milestone payment or the individual failed to prepare a report or assessment on time.

This new information is added to the system and a 'new' score ($K_{(i+1)}$) is calculated in step 650. At each iteration, as new data are added, the score is continually evaluated to determine if the entrepreneur, business and social network of the entrepreneur merit proceeding with the business transaction proposed by the entrepreneur.

Rapid recalculation of scores to incorporate new social data, new behavior data and new business data provides advantages such as quick identification of business opportunities/transactions that are in danger of failing. Thus, the funding party need not wait until a transaction becomes unsalvageable to mitigate their losses and fix transaction related issues.

As mentioned above, the present technology provides advantages over other scoring models, such as are used for credit scores. These simple models typically identify a targeted 'ideal' customer type, such as those that repay loans fully and on time, and the 'non-ideal' customer such as those that do not repay a loan fully. Such a process uses mathematics to create a linear equation based on several measureable attributes of the customer population that provides 'maximum' separation of the two customer types. This linear scoring model is often based upon linear 'discriminant analysis' or some variant thereof. Once a scoring model is 'built' one simply uses the model to obtain a score for each individual. The scoring of an individual was a low-computing resource activity that could be achieved by hand. These processes used high initial reliance on computing and statistics at model build time, but low reliance on computing and statistics at individual assessment time. While linear discriminant analysis is simple and easy to understand, it often is not the ideal methodology for 'scoring' individuals in many circumstances.

Major criticisms regarding these linear methodologies have to do with the heterogeneity of the two types of individuals being evaluated. There may be a great variety of reasons why people do not pay loans, for example—suggesting that there is not one single 'type' of non-paying customer, but many types. Similarly, there may be many types of 'paying' customers. So, instead of drawing a line from the centroid of one type of individual to the centroid of the other (which is the essence of linear discriminant analysis), clustering of customers into various type-groupings is employed by the present technology.

To be sure, the present technology employs multi-loci modeling that differs from traditional linear scoring in that there is no single linear discriminant function that provides a single scoring 'line' in the entrepreneur attribute space. Instead, individuals are grouped based on a weighting of their attributes (e.g., individual features or a set of features). Weightings are used to create these clusters are selected to maximize the variation in customer group measurements (e.g., loan repayment) on a group-by-group basis. Customer group measurements are also referred to herein as "desirable business behaviors".

The attribute weightings that provide the greatest variation in customer-cluster performance are identified by the system 405. When a target individual is evaluated, that target individual is compared to the centroid of a plurality of clusters of other individuals. The target individual is scored relative to its 'distance' to the nearest, best performing cluster. To be sure, distance in this instance is the attribute-weighted measures used to optimize the clustering. In other words, the individual is not compared to the single centroid of all ideal individuals—as in linear discriminant analysis—but rather is compared to the nearest, best centroid of successful individuals that are most like this target individual. This approach uses a high-level of computing resources and statistical power at the initial time of model building, but it also uses a high-degree of computing and statistical analysis at the time that each individual is evaluated.

To be sure the 'ideal individual/entrepreneur' is based on an expectation of entrepreneurial success, not simply of a linear analysis such as with credit assessment predicting loan repayment.

Figure 7:
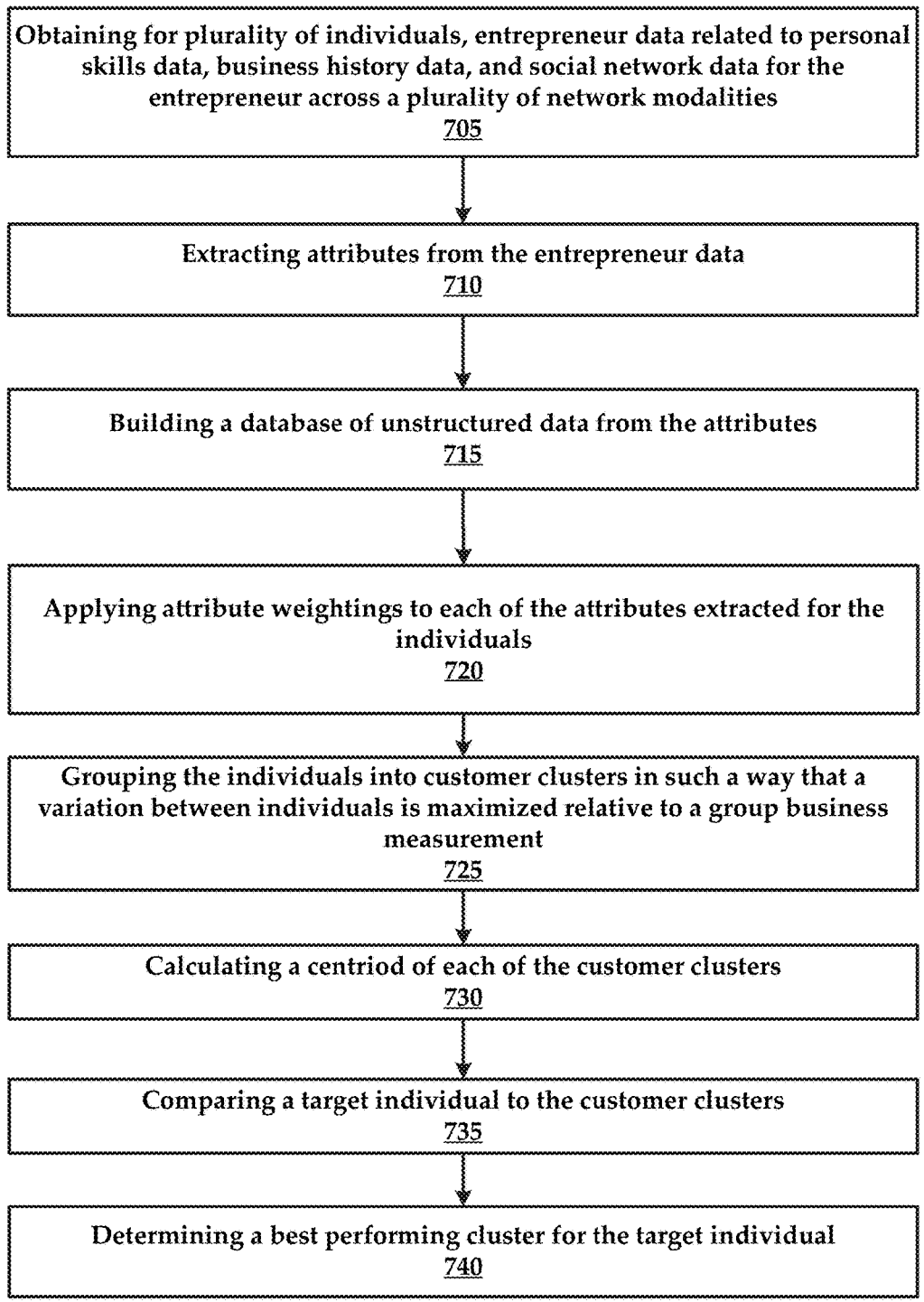
FIG. 7 is a flowchart of an example method for performing a multi-loci modeling of an individual to determine their entrepreneurial ability.

Using the methodology provided above, the present technology can include a method that is executed by the system 405, as illustrated in FIG. 7. In some embodiments, the method can comprise obtaining 705 for plurality of individuals, entrepreneur data related to personal skills data, business history data, and social network data for the entrepreneur across a plurality of network modalities.

Once the data has been obtained, the method includes extracting 710 attributes from the entrepreneur data and building 715 a database of unstructured data from the attributes.

Next, the method includes analyzing a target individual against the database using a multi-loci modeling process. In some embodiments, the multi-loci modeling process comprises applying 720 attribute weightings to each of the attributes extracted for the individuals. Next, the method includes grouping 725 the individuals into customer clusters in such a way that a variation between individuals is maximized relative to a group business measurement.

In some embodiments, the method includes calculating 730 a centroid of each of the customer clusters and comparing 735 a target individual to the customer clusters.

Finally, the method includes determining 740 a best performing cluster for the target individual. In some embodiments, the best performing cluster is a customer cluster of the customer clusters with a shortest distance between the target individual and the customer cluster. An illustration of a multi-loci analysis is provided in FIG. 3.

Figure 8:
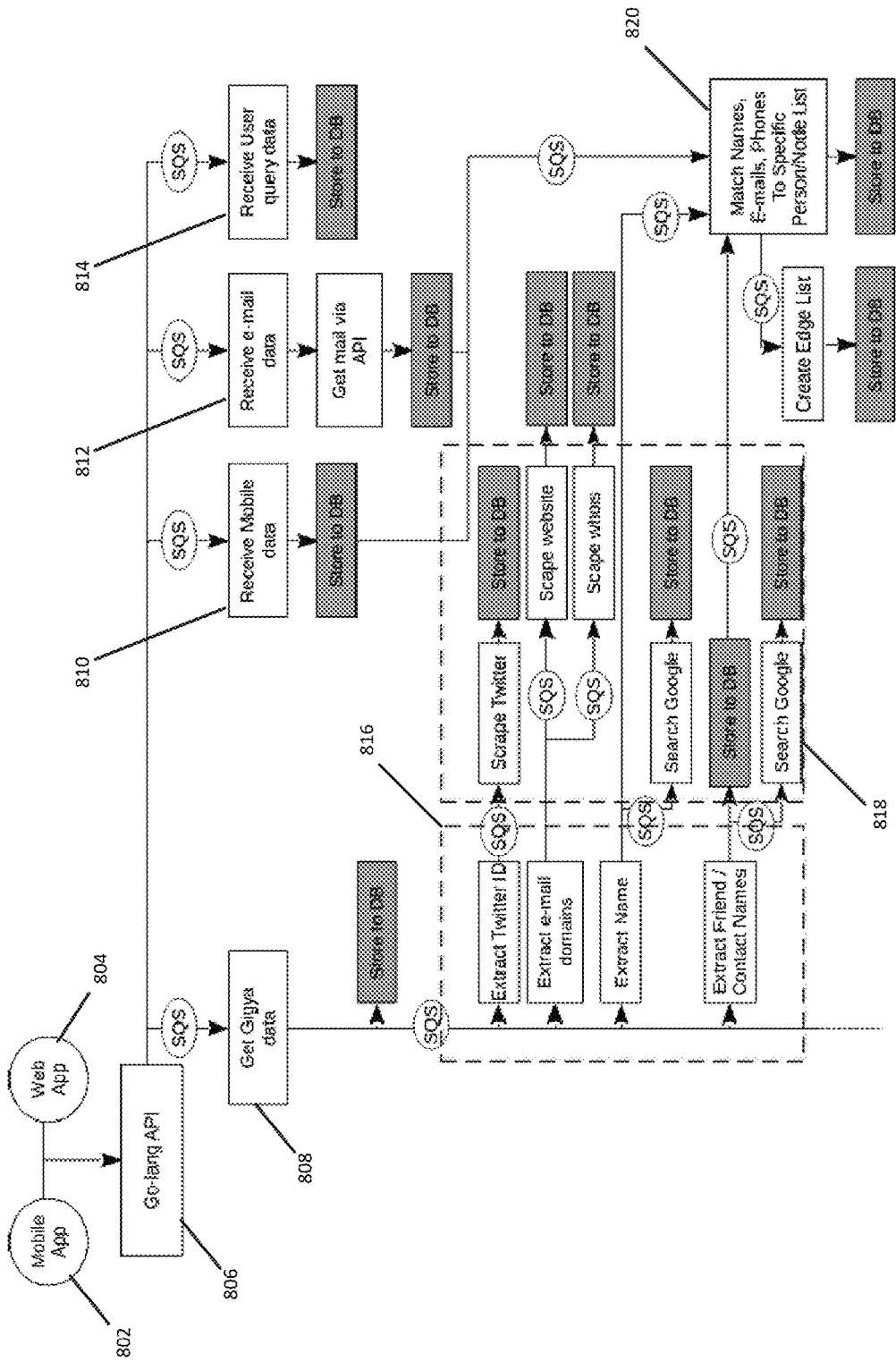
FIG. 8 is an example flow diagram of a data collection and analysis process of the present technology.

FIG. 8 illustrates an example flow diagram that can be implemented in a specific purpose computing device, such as the system of FIG. 4. In some embodiments, data are initially aggregated from a Mobile App 802 installed on a mobile device such as a smart phone, or from a Web App application 804 available to the User over the Internet. Both of these systems communicate with a Go-lang API 806 accessible via an Internet address. Once this API has been activated, it then initiates a series of actions on multiple machine clusters within a computing "cloud."

Each ellipsoid in this diagram identified as "SQS" represents a messaging queue that signals to yet another computer or cluster of computers to initiate the next process described. For example, the Go-lang API 806 initiates a process Get Gigya data 808—which is a third party aggregator of FaceBook™, LinkedIn™ and Twitter™ data (as well as other social-media data). These data are collected and stored to a database, but several other processes on several other computer clusters are initiated. These processes, in turn, spawn other processes, which when all are completed, result in several types of data having been stored with respect to the User who engaged with the Mobile or Web App.

For example, the system can include a Receive Mobile data module 810 that receives SMS messages and call logs from the mobile device (as well as other communication types), a Receive Email module 812 that receives emails from email accounts associated with an individual, and a Receive User query data module 814 that obtains data about the individual from various electronic resources such as data repositories, social networks, websites, and similar resources.

Data Reduction Through Feature Identification

In addition to these data collection steps, additional processes are triggered that scan the data resulting from the above-described process. These other processes extract features form the large volume of resulting data. Features can be extracted in a feature extraction layer 816. The system can employ a plurality of feature extractors to extract email domains, social network information, names, and so forth.

For example, a feature entitled "Experience" might be extracted from these data using a number of data elements. Specifically, the dates of employment associated with an individual might be noted from the data records obtained, together with the job titles. These are often available from aggregated data from social media sites. In one embodiment, experience score values result from the aggregate number of years worked within an industry.

Additionally, a search engine query can be triggered using the individual's name and country (or company, or city, or profession) and the results returned by the search engine are stored. If the details from the returned pages match the details of the individual in the enquiry, then certain context information is extracted. The source of the information is extracted (Was this a 'news' source? An 'industry' publication? A conference proceeding? An NGO publication?, and so forth). Based upon the number and nature of the web-based references for this individual, the scoring process assigns a numerical value to this individual. If they appear to be a high-profile person with numerous quotations and references in industry magazines or conference proceedings, for example, then it can be presumed that the individual has a high degree of experience and credibility. If no web references are found (or if the only references are selfgenerated via profile information supplied by the individual to sites such as LinkedIn), then that individual would have a much lower experience score.

The system can utilize a plurality of search engines and data scrapers 818 to obtain additional information using the extracted features determined in the feature extraction layer 816.

In some embodiments, the system can utilize a correlation process 820 to match extracted names, emails, phone records, and other extracted entrepreneur data to a specific person or node (entity, business, and so forth).

Scoring Use Case

Provided below is a non-limiting example of a scoring process that utilizes several extracted features. These scores indicate some of the potential measures used in calculating a k-score ($K_i$). The variable "REP" near the bottom of the TABLE 1 is an indicator of the type of scoring that can be utilized to enhance the score of an entrepreneur that ensures all money is repaid—and that penalizes an entrepreneur that does not ensure all money is repaid. Each of these 'variables' in this example only totals a maximum of five points. The weighting of each component in a more sophisticated $K_i$ entrepreneur score would be significantly different due to the presence of many additional features.

TABLE 1

| | |
|---|---|
| Education | *ED: Score 5 pts Graduate degree, 4 pts University degree, 3 pts some University, 2 pts High School, 0 no mention |
| Experience | *EX: Add 1 point for each year of employment in related field to max 5 pts |
| Skills | *SK: Add .5 point for each relevant skill to max 5 pts |
| Authentication | *AU: Score 1 point each modality authenticated to max 3 pts, plus 1 point for phone & SMS, plus 1 point for e-mail |
| Web Presence | *WP: Add 5 points >3 web references, 4 points 3 references, 3 points 1-2 references, 0 points no references |
| Social Network | *SN1: Add .1 point for each friend/contact with >3 web references to max 5 points |
| Social Network | *SN2: Add .25 points for each friend/contact with >3 web references with whom contact <30 days to max 5 points |
| Business Info | *BI1: 5 points if No Explanation needed, 4 points Some Explanation, 3 points Extensive Explanation, 2 points Don't Understand, 1 point not able, 0 points No Try |
| Business Info | *BI2: Score 1 point for each bus info item submitted to max 5, decays ½ pt per week |
| Referrals | *REF1: Score 1 point for each referral made that connects to Kountable, to max 5 points |
| Referrals | *REF2: Score .25 points for each referral made to max 5 points |
| Repayment | *REP: +5 points complete-timely repayment, −1 points complete-non-timely repayment w/legit excuse, −2 points complete-non-timely repay w/o excuse but w/effort, −3 points incomplete payment w/effort, −5 points incomplete payment no effort |
| Responsiveness | *RES: Score 5 points if respond in <24 hours, 4 points <48 hours, 3 points <72 hrs, 2 points <7 days, 1 point <30 days, 0 points >30 days |

This specific example of scoring illustrates 13 specific features that are scored in order to calculate one embodiment of a $K_i$ score. In the complete scoring model there are hundreds of features extracted and scored. Continuous analysis adds additional 'features' to the model at each development cycle. The features are quantitative representations of information known about the individuals. A numerical evaluation process continuously examines features available and identifies which features are most predictive of the behaviors that we desire to select.

Example of Weighting

There are, quite literally, an infinite number of ways to obtain weightings for the observed and measureable 'feature scores' that are used in getting the various $K_1$ and subsequent $K_i$ scores. The method for obtaining the weights that are used, however, generally follows the process defined below.

First, each individual ($X_i$) is represented by p feature measures. In one embodiment, there are perhaps hundreds of such measures. An example equation is provided below $$X_i = \{x_{i1}, x_{i2}, x_{i3}, \ldots, x_{ip}\} \quad \text{Equation 1}$$

Generally, the system obtains measures from n individuals (n>p), then constructs a matrix X in accordance with Equation 2 below $$X = \begin{bmatrix} x_{11} & x_{12} & x_{13} & & x_{1p} \\ x_{21} & x_{22} & x_{23} & \ldots & x_{2p} \\ x_{31} & x_{32} & x_{33} & & x_{3p} \\ \vdots & & & \ddots & \vdots \\ x_{n1} & x_{n2} & x_{n3} & \ldots & x_{np} \end{bmatrix} \quad \text{Equation 2}$$

From this matrix X we can find up to p unique principal components (or Eigen vectors). A principal component consists of a vector of weights $\omega_i = \{\omega_1, \omega_2, \omega_3, \ldots \omega_p\}$ and a measure $\lambda_i$ (the Eigen value associated with the Eigen vector). Usually these Eigen vectors are sorted in descending order of their Eigen values and are called the first principal component, the second principal component, and so forth. The weights, $\omega_i$, for each principal component comprise an initial set of weights to apply to the measures $X_i$ for each individual. In some embodiments, these weights, $\omega_i$, are usually further weighted by the 'information content' of each of the principal components.

One measure of 'information' to use for weighting a principal component might be the 'Shannon information index' utilized in information theory. In this case, the information weighting would have to do with the 'randomness' of the observations within that principal component. For example, if the 'good entrepreneurs' (each with its measures $X_i$) were completely disordered when plotted along that principal component, then the system would consider there to be little information in that component. If, on the other hand, all of the 'good entrepreneurs' were clustered together (say at the high end of that component dimension), then the system would consider there to be a great deal of Shannon information in that component.

The system can then figuratively 'plot' the positions of the entrepreneurs in this 'information-weighted' principal component space and utilize those information/Eigen vector weights as Euclidean coordinates. Most frequently, only the first few (arbitrarily few—sometimes three, sometimes five, and so forth depending upon the fall-off of the information-weighted Eigen value curve) Euclidean coordinates are utilized.

Using a methodology similar to 'k-means' clustering, we cluster 'good entrepreneurs' into small groups within this weighted space. The mean values of these clusters of 'good entrepreneurs' constitute centroids for our multi-loci measurements. Each potential entrepreneur is measured against each of these 'loci' of 'good entrepreneurs' (i.e., a distance measure is calculated between the 'location' of the potential entrepreneur in this weighted Euclidean space and the centroid of each cluster of 'good entrepreneurs' in the same weighted space). The k-score (entrepreneur score) is, in reality, a measure of this distance of the potential entrepreneur to the nearest centroid of a cluster of 'good entrepreneurs.' An example scoring methodology of the present technology, however, for historical reasons, uses an inverse measure of distance for the k-score. That is, a larger score represents a smaller distance to a centroid. An example k-score, then, is in reality a measure of 'proximity' to a centroid rather than a measure of distance.

In an example methodology summary, a system of the present technology is configured to obtain principal components of an entrepreneur data space. Next, the system will obtain information weightings for each of the principal component dimensions and rotate the entrepreneur data using the information-weighted principal component values. In some embodiments, the system can cluster 'good entrepreneurs' into small groups and measure the 'distance' between the potential entrepreneur and the known centroids of 'good entrepreneurs'. In some embodiments, the system can transform the distance measure to the nearest centroid into a proximity measure.

The actual principal component rotations and the actual weights utilized in this analytical process are derived by the mathematical operations described above. As the number of measures applied to each entrepreneur increase (which can increase as our experience grows), the mathematics determine the scores as a result of applying this process to the data.

Figure 9:
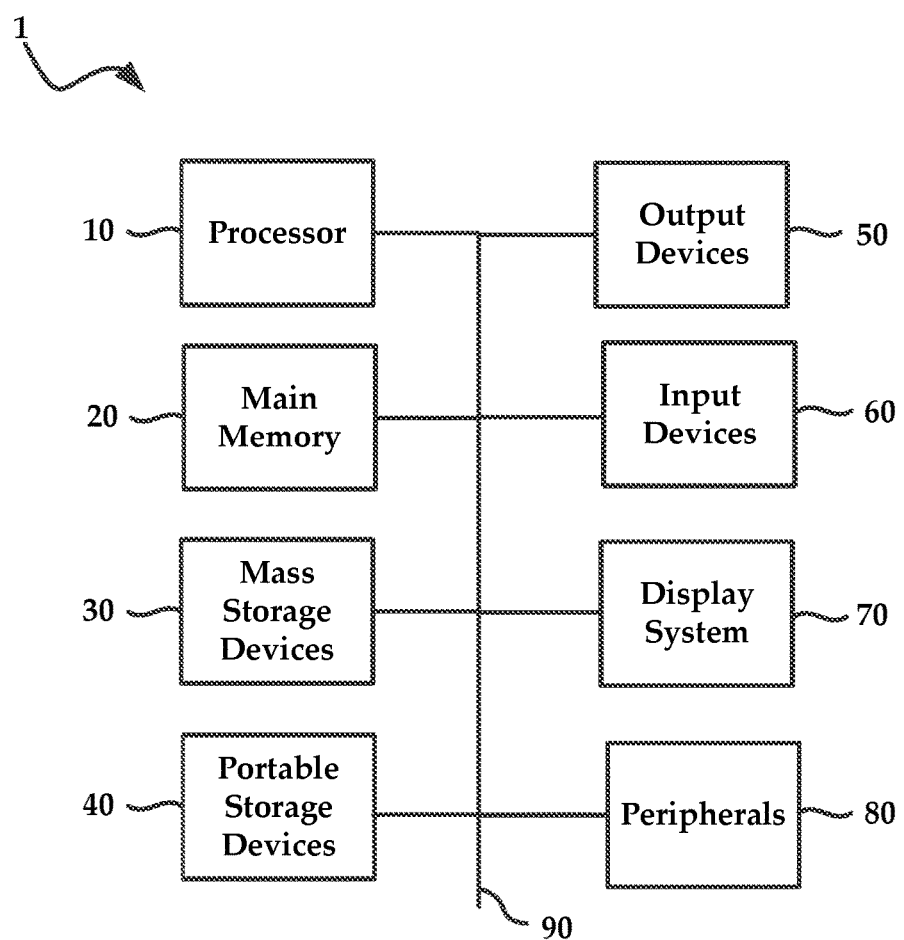
FIG. 9 illustrates an exemplary computing system that may be used to implement embodiments according to the present technology.

FIG. 9 illustrates an exemplary computing system 1 that may be used to implement an embodiment of the present systems and methods. The computing system 1 of FIG. 9 includes a processor 10 and main memory 20. Main memory 20 stores, in part, instructions and data for execution by processor 10. Main memory 20 may store the executable code when in operation. The computing system 1 of FIG. 9 further includes a mass storage device 30, portable storage device 40, output devices 50, input devices 60, a display system 70, and peripherals 80.

The components shown in FIG. 9 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system 1 of FIG. 9. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the system 1 as shown in FIG. 9 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 8 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the technology in the form disclosed. Many modifications and variations will be apparent to those of ordinary skill in the art without departing from the scope and spirit of the technology. Exemplary embodiments were chosen and described in order to best explain the principles of the present technology and its practical application, and to enable others of ordinary skill in the art to understand the technology for various embodiments with various modifications as are suited to the particular use contemplated.

Aspects of the present technology are described above with reference to flowchart illustrations and/or block diagrams of methods, apparatus (systems) and computer program products according to embodiments of the technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

While the present technology has been described in connection with a series of preferred embodiment, these descriptions are not intended to limit the scope of the technology to the particular forms set forth herein. It will be further understood that the methods of the technology are not necessarily limited to the discrete steps or the order of the steps described. To the contrary, the present descriptions are intended to cover such alternatives, modifications, and equivalents as may be included within the spirit and scope of the technology as defined by the appended claims and otherwise appreciated by one of ordinary skill in the art.

What is claimed is:

1. A method, comprising:
    obtaining entrepreneur data related to personal skills data, business history data, and social network data for an entrepreneur across a plurality of network modalities, the plurality of network modalities comprising social networks, phone records, and message records;
    determining business event information for business events identified between the entrepreneur and contacts of the entrepreneur found in the entrepreneur data, the business event information comprising any of:
        categorizing social media communications for the entrepreneur from the entrepreneur data;
        determining a distribution of the social media communications between business and friends;
        inferring diversification, breadth, and seriousness of the entrepreneur from the distribution; and
        analyzing phone records, SMS messages, and email messages for the entrepreneur for time, duration, and contact;
    determining any of currentness, originating party, sequences of SMS messages, frequency of SMS messages with the contacts, time of day of the SMS messages, sequences of calls, frequency of calls with the contacts, time of day of the calls, and combinations thereof;
    storing the business event information from the plurality of network modalities as unstructured data;
    determining contact clusters of email addresses for the contacts;
    determining category distributions and linkages between the entrepreneur and the contacts; and
        performing a dynamic measurement of engagement between the entrepreneur and the contacts by looking for contacts between the entrepreneur and the contacts that cross the plurality of network modalities including social media, phone records, SMS messages, and email messages, wherein the dynamic measurement comprises an entrepreneur score for the entrepreneur.

2. The method according to claim 1, further comprising calculating an experience indicator from the entrepreneur data, the experience indicator being calculated from a combination of years in workforce, number of employers, positions held, skills enumerated by the contacts about the entrepreneur, press releases referencing the entrepreneur, and combinations thereof.

3. The method according to claim 1, wherein the personal skills data comprises education information that includes degrees earned, educational institutions attended, certificates, references, and combinations thereof.

4. The method according to claim 1, further comprising determining from the entrepreneur data homophily or heterophily between the entrepreneur and the contacts by determining a distribution between an age of the entrepreneur and ages of the contacts.

5. The method according to claim 1, further comprising:
determining a geographical footprint for the entrepreneur from the entrepreneur data;
determining business opportunities for the entrepreneur based on the geographical footprint and development information for locations found in the geographical footprint; and
inferring a breadth of experience from the business opportunities and geographical footprint.

6. The method according to claim 5, further comprising:
determining a geographical footprint for each of the contacts from the entrepreneur data;
determining business opportunities for each of the contacts based on the geographical footprint and development information for locations found in the geographical footprint;
inferring a breadth of experience from the business opportunities and geographical footprint; and
comparing the breadth of experience for the entrepreneur to the breadth of experience for the contacts to determine variety and richness of relationships between the entrepreneur and the contacts.

7. The method according to claim 1, further comprising evaluating from the entrepreneur data, email addresses for the contacts by determining a domain of the email addresses and classifying a domain type.

8. The method according to claim 1, further comprising determining from the entrepreneur data a diversity indicator for the entrepreneur based on a diversity of domain types of the email addresses.

9. The method according to claim 1, further comprising:
extracting features from the entrepreneur data that are indicative of education, experience, age homophily or heterophily, geographical footprint, geographical distribution, social network context, referrals, phone records, SMS messaging, email communications, and combinations thereof;
calculating a distance for the entrepreneur from one or more clusters of features for other entrepreneurs; and
estimating a relative strength for the entrepreneur based on the distance.

10. The method according to claim 1, wherein the business history data comprises historical business information relating to business income, expenses, and business growth by date.

11. The method according to claim 10, further comprising:
calculating a business stability score from the business history data;
determining a consistency indicator for the business history data related to diligence in business reporting; and
calculating an expected payment timing by evaluating business history data comprising sales amounts, delivery dates, invoicing dates, and collection dates from customers.

12. A multi-loci modeling method, the method comprising:
obtaining for a plurality of individuals, entrepreneur data related to personal skills data, business history data, and social network data for an entrepreneur across a plurality of network modalities;
extracting attributes from the entrepreneur data;
storing the extracted attributes as unstructured data; and
performing a multi-loci modeling by:
applying attribute weightings to each of the attributes extracted for the individuals;
grouping the individuals into customer clusters in such a way that a variation between individuals is maximized relative to a group business measurement;
calculating a centroid of each of the customer clusters;
comparing a target individual to the customer clusters;
determining the attribute weightings that provide greatest variation in clusters;
determining a best performing cluster for the target individual, wherein the best performing cluster is a customer cluster of the customer clusters with a shortest distance between the target individual and the customer cluster; and
providing the target individual with a business opportunity that matches their best performing cluster.

* * * * *